United States Patent
Qi et al.

(10) Patent No.: US 7,962,593 B2
(45) Date of Patent: Jun. 14, 2011

(54) SYSTEM AND METHOD FOR PUBLISHING ADVERTISEMENT SERVICE INFORMATION

(75) Inventors: Quan Qi, Shenzhen (CN); Qian Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1190 days.

(21) Appl. No.: 11/620,108

(22) Filed: Jan. 5, 2007

(65) Prior Publication Data

US 2007/0185983 A1 Aug. 9, 2007

Related U.S. Application Data

(63) Continuation of application No. PCT/CN2005/002131, filed on Dec. 8, 2005.

(30) Foreign Application Priority Data

Dec. 23, 2004 (CN) .......................... 2004 1 0102477

(51) Int. Cl.
*G06F 15/173* (2006.01)
(52) U.S. Cl. .................. 709/223; 709/224; 709/230
(58) Field of Classification Search .................. 709/223, 709/224, 230
See application file for complete search history.

(56) References Cited

U.S. PATENT DOCUMENTS

| | | | | |
|---|---|---|---|---|
| 6,360,243 | B1* | 3/2002 | Lindsley et al. | 718/103 |
| 2002/0062342 | A1* | 5/2002 | Sidles | 709/203 |
| 2002/0120518 | A1 | 8/2002 | Carney et al. | |
| 2004/0198390 | A1 | 10/2004 | Kaise | |
| 2004/0237102 | A1* | 11/2004 | Konig et al. | 725/36 |
| 2005/0033641 | A1* | 2/2005 | Jha et al. | 705/14 |
| 2005/0197164 | A1* | 9/2005 | Chan | 455/566 |
| 2006/0041470 | A1* | 2/2006 | Filho et al. | 705/14 |
| 2006/0069613 | A1* | 3/2006 | Marquardt | 705/14 |
| 2009/0198538 | A1* | 8/2009 | Gupta et al. | 705/7 |

FOREIGN PATENT DOCUMENTS

| | | |
|---|---|---|
| CN | 1294811 A | 5/2001 |
| CN | 1365477 | 8/2002 |
| CN | 1553390 | 12/2004 |
| JP | 2002133269 | 5/2002 |
| KR | 1020010098294 A | 11/2001 |
| WO | WO 00/49793 | 8/2000 |

OTHER PUBLICATIONS

English Translation of the Written Opinion in the PCT Search Report.
First Office Action of the European patent application.

* cited by examiner

*Primary Examiner* — Mohamed Wasel
(74) *Attorney, Agent, or Firm* — Slater & Matsil, L.L.P.

(57) ABSTRACT

Embodiments of the present invention provide a system and a method for publishing advertisement service information. The system includes an advertisement Portal sever, a data storage device, and an advertisement service central server. The method includes receiving, by the advertisement service Portal server of the system for publishing advertisement service information, advertisement information including advertisement contents and an advertisement mode and saving the advertisement information in the data storage device; acquiring, by the advertisement service central server, the advertisement information from the data storage device or receiving the advertisement information from the advertisement service Portal server; and transferring the advertisement information including advertisement contents to the service application system according to the advertisement mode. According to the present invention, sharing information resources is realized, which avoids the repeated constructions of various service application systems for implementing an advertisement service and implements uniform management on the various service application systems.

26 Claims, 10 Drawing Sheets

SYSTEM AND METHOD FOR PUBLISHING ADVERTISEMENT SERVICE INFORMATION

FIELD OF THE INVENTION

The present invention relates to the technology of publishing information through a network, and more particularly, to a system and a method for publishing advertisement service information.

BACKGROUND OF THE INVENTION

At present, a great number of network application systems, have successfully realized a function of publishing advertisement service information, such as voice service systems, Short Message Service (SMS) systems, multimedia message systems, network-based game service systems, email systems, stream media service systems, customized ring service systems, instant message systems, digital TV systems, etc.

For example, a method for playing advertisements using a ring back tone is disclosed in Chinese Patent No. 00800152.9 of which the title is "Method for Playing Advertisements Using a Ring Back Tone". The method may be described below. An originating switch system, upon receiving a ring back tone returned by a terminating switch system, identifies the ring back tone. If the ring back tone is a user telephone ring, the originating switch system will query a database to determine whether the user corresponding to an originating number has registered as an advertisement member. If the user is an advertisement member, the originating switch system will select an advertisement ring back tone preset from advertisement storage and send the advertisement ring back tone to an originating telephone.

To employ the method for playing advertisements using a ring back tone, both the hardware and software of the switch system have to be updated and a specific database for advertisement ring back tones is also needed to be created, which makes the system much more complicated and increases the difficulty to maintain the system.

Another method is publishing advertisement information through SMS systems or multimedia message systems. The advertisement information is sent to SMS users or multimedia message users who have registered an advertisement service through an SMS centre or multimedia message centre in group transmit mode.

In the above examples, each service application system works independently. For the same user, it is impossible to subscribe a ring back tone advertisement and a short message advertisement through one service flow. Instead, the user has to register in different application service systems respectively, which makes the operation complicated for the user and also leads to a waste of system resources. As a result, communication systems may not manage similar services in application service systems uniformly, and every application service system has to be reconstructed in order to implement advertisement services.

A third example is publishing advertisement information by a network-based game service system. The advertisement information is generally sent to a network-based game user when the network-based game user uses the network-based game system. As the network-based game service system may not share information with other systems, such as an SMS system, a multimedia message system and so on, if an advertiser wants to publish the same text advertisement information through both the network-based game service system and the SMS system or to publish the same picture advertisement information through both the network-based game service system and the multimedia message system, the advertiser has to input the advertisement information into each of the service application systems, which brings a waste of system resources to the service application systems and relatively higher cost of publishing advertisement information to the advertiser.

To sum up, since the information may not be shared among different service application systems and communication systems cannot manage the advertisement service in each of the service application systems uniformly, the conventional methods for publishing advertisement information using networks force the advertisers to input identical advertisement information to different service application systems repeatedly. At the same time, an advertisement service user has to register time after time, which results in complicated operation of services and a waste of system resources.

SUMMARY OF THE INVENTION

An embodiment of the present invention provides a system for publishing advertisement service information. The system enables each service application system to share information resources of the publishing system and manage the publishing of advertisement service information in each service application system uniformly.

Another embodiment of the present invention further provides a method for publishing advertisement service information. The method enables each service application system to share information resources and manage the publishing of advertisement service information in each service application system uniformly.

The system for publishing advertisement service information includes:

an advertisement service Portal server, receiving advertisement information including advertisement contents and an advertisement mode;

a data storage device, storing the advertisement information including the advertisement contents and the advertisement mode; and an advertisement service central server, acquiring the advertisement information including the advertisement contents and the advertisement mode from the data storage device; transferring the advertisement information including the advertisement contents to a service application system according to the advertisement mode.

The advertisement service Portal server is further configured for receiving user information, user subscription information and advertiser information; and saving the user information, the user subscription information and the advertiser information in the data storage device.

Preferably, the advertisement service Portal server is further configured for generating an advertisement task according to the advertisement mode, saving the advertisement task in the data storage device, examining the advertisement task; and setting a flag to show whether the advertisement task passes the examining, saving the advertisement task and the flag in the data storage device or sending the advertisement task passing the examining to the advertisement service central server directly.

The advertisement service central server is configured for receiving the advertisement task passing the examining from the advertisement service Portal server or searching the data storage device to acquire the advertisement task with the flag showing that the advertisement task has passed the examining; searching the data storage device according to the advertisement mode in the advertisement task to acquire target user information; and sending the target user information and the advertisement information including the advertisement contents to the service application system corresponding to the target user information.

The advertisement service central server is further configured for storing various charge modes; finding a charge mode according to both the task information of the advertisement task and the target user information; generating a Charging Data Record (CDR), storing the CDR; and sending the CDR to the a charge system.

Preferable, the advertisement service central server is further configured for sending or receiving the advertisement information including the advertisement contents to or from a second advertisement service central server of another system for publishing advertisement service information.

The data storage device includes:

an advertisement database, storing the advertiser information and the advertisement information including both the advertisement contents and the advertisement mode; and a user database, storing the user information and the user subscription information.

Preferably, the system further includes:

an advertisement gateway, implementing protocol conversion for information transferred between the advertisement service central server and the service application system.

The system advertisement gateway is further configured for sending or receiving the advertisement information including the advertisement contents to or from a second advertisement service central server of another system for publishing advertisement service information.

Preferably, the advertisement gateway is further configured for storing information of service application systems and information of interface protocols and transferring the advertisement information including the advertisement contents that is received from the advertisement service central server to the service application system through an interface protocol according to the information of the service application systems and the information of the interface protocols.

The advertisement gateway is configured for making statistics on various information to generate a report according to information in the data storage device, monitoring the flow of the advertisement gateway and the load of system resources, and configuring resources for each interface.

The advertisement gateway is also configured for storing various charge modes; finding a charge mode according to the information received from the advertisement service central server; generating a CDR and storing the CDR; and sending the CDR to a charge system.

The charge modes include at least one of a preferential fee for each advertisement received, a preferential fee for advertisements received monthly, and rates for advertisements received from different service application systems.

The advertisement mode includes at least one of:

setting a user list, using which an advertisement is published to users;

setting a condition that user attributes should meet, according to which an advertisement is published to the users of which attributes meet the condition;

setting a publishing condition unrelated to user attributes, according to which an advertisement is published when the publishing condition is met;

setting a target service type of advertisements or a service application system, according to which an advertisement is limited to be published in services of the target service type or in the service application system.

The service application system is at least one of a voice service system, a Short Message Service (SMS) system, a multimedia message system, a game service system, an email system, a stream media service system, a customized ring service system, an instant message system and a digital television system, a presence service system, and a PoC service system.

The method for publishing advertisement service information includes:

receiving, by an advertisement service Portal server of a system for publishing advertisement service information, advertisement information including advertisement contents and an advertisement mode;

upon receiving the advertisement information, saving the advertisement information into a data storage device;

acquiring, by an advertisement service central server, the advertisement information from the data storage device, or receiving the advertisement information from the advertisement service Portal server;

transferring, by the advertisement service central server, the advertisement information including the advertisement contents to a service application system according to the advertisement mode in the advertisement information acquired from the data storage device or received from the advertisement service Portal device.

The method further includes:

upon receiving the advertisement information, generating, by the advertisement service Portal server, an advertisement task for the advertisement information according to the advertisement mode, and saving the advertisement task into the data storage device or sending the advertisement task to the advertisement service central server.

The method further includes:

upon generating the advertisement task, examining, by the advertisement service Portal server, the advertisement task, and sending the advertisement task passing the examining to the advertisement service central server.

The method further includes:

upon generating the advertisement task, examining, by the advertisement service Portal server, the advertisement task, and setting a flag for showing whether the advertisement task passes the examining;

acquiring, by the advertisement service Portal server, the advertisement task from the data storage device and processing the advertisement task of which the flag shows that it passes the examining.

The process of examining the advertisement task includes one of the processes of:

acquiring the advertisement task from the data storage device, examining the advertisement task, and rejecting the advertisement task including a filtered keyword set in advance; and providing an examining interface through which management personnel examines the advertisement task.

The method further includes:

searching, by the advertisement service central server, the data storage device according to the advertisement mode in the advertisement task; obtaining the advertisement contents and target information; and sending the advertisement information including the advertisement contents to a target service application system or a target system for publishing advertisement service information according to the target information.

The method further includes:

upon sending the advertisement information including the advertisement contents to the target service application system or the target system for publishing advertisement service information, obtaining, by the advertisement service central server, a charge mode from various charge modes stored in advance according to the advertisement task, generating a CDR according to the charge mode and storing the CDR.

The process of sending the advertisement information including the advertisement contents to the target service application system or the target system for publishing advertisement service information includes:

sending, by the advertisement service central server, the advertisement information including advertisement contents to an advertisement gateway;

implementing, by the advertisement gateway, protocol conversion for the advertisement information;

upon converting the advertisement information to protocol information accepted by the target service application system or the target system for publishing advertisement service information, sending the advertisement information converted to the target service application system or the target system for publishing advertisement service information.

Preferably, the method further includes:

upon sending the advertisement information to the target service application system, obtaining, by the advertisement gateway, the charge mode from the various charge modes stored in advance according to the advertisement task, generating the CDR and storing the CDR.

The method further includes implementing, by the advertisement gateway, flow control on the advertisement information sent by the advertisement service central server.

Preferably, the method further includes:

making, by the advertisement gateway, statistics on various information to generate a report according to information in the data storage device, monitoring flow of the advertisement gateway and load of system resources, and configuring resources for each interface.

When the service application system includes an SMS system, the advertisement gateway communicates with the Internet Short Message Gateway (ISMG) of the SMS system by China Mobile Peer to Peer Protocol/Short Message Gateway Interface Protocol (CMPP/SGIP) and sends the advertisement information including advertisement contents to the SMS centre through the ISMG, and the SMS centre forwards the advertisement information including advertisement contents to a user terminal in a short message format; or, the advertisement gateway communicates directly with the SMS centre of the SMS system through a Short Message Peer to Peer (SMPP) protocol, and the SMS centre forwards the advertisement information including advertisement contents to a user terminal in a short message format.

The advertisement mode includes at least one of:

setting a user list, using which an advertisement is published to users;

setting a condition that user attributes should meet, according to which an advertisement is published to the users of which attributes meet the condition;

setting a publishing condition unrelated to user attributes, according to which an advertisement is published when the publishing condition is met;

setting a target service type of advertisements or a service application system, according to which an advertisement is limited to be published in services of the target service type or in the service application system.

An embodiment of the present invention provides an advertisement service Portal server.

The advertisement service Portal server includes:

an information input unit, receiving advertisement information including advertisement contents and an advertisement mode; and an information processing unit, saving the advertisement information received from the information input unit into the data storage device.

The information input unit is further configured for receiving user information and user subscription information, and/or advertiser information; the information processing unit is further configured for saving the user information and the user subscription information, and/or advertiser information, into a data storage device.

The information processing unit is configured for creating a first account number according to the user information, receiving various user information registered or updated, and saving the various user information registered or updated into the data storage device;

creating a second account number according to the advertiser information, receiving various advertiser information registered or updated, and saving the various advertiser information registered or updated into the data storage device;

generating an advertisement task according to the advertisement mode in the advertisement information, and saving the advertisement task into the data storage device; and monitoring the advertisement task, and setting a flag showing whether the advertisement task passes the examining or sending the advertisement task passing the examining to an advertisement service central server.

An embodiment of the present invention provides an advertisement service central server.

The advertisement service central server includes:

an advertisement task unit, receiving an advertisement task passing the examining from an advertisement service Portal server or searching a data storage device to acquire the advertisement task with the flag showing that the advertisement task has passed the examining; searching the data storage device according to an advertisement mode in the advertisement task to acquire target user information; and an advertisement output unit, sending the advertisement information including the advertisement contents to a service application system corresponding to the target user information.

The advertisement service central server further includes:

a charge unit, storing various charge modes, finding a charge mode according to the advertisement task and the target user information, generating and storing a CDR, and providing the CDR to a charge system.

An embodiment of the present invention provides an advertisement gateway.

The advertisement gateway includes:

a gateway proxy unit which includes an interface proxy module and at least one application system interface;

the interface proxy module, storing service application system information and interface protocol information, receiving advertisement information including advertisement contents from an advertisement service central server, and transferring the advertisement information including the advertisement contents to a service application system by an interface protocol according to the service application system information and the interface protocol information.

The advertisement gateway further includes:

a service management unit, making statistics on various information to generate a report according to information stored in the data storage device, monitoring flow of the advertisement gateway and load of system resources, and configuring resources for each interface.

Preferably, the advertisement gateway further includes a charge unit, storing various charge modes, obtaining a charge mode according to the advertisement task and the target user information, generating and storing a CDR, and providing the CDR to a charge system.

It may be seen from the above technical schemes that, in the system for publishing advertisement service information and the publishing method therewith according to the present invention, a system for publishing advertisement service information is set, and the system includes an advertisement Portal sever, a data storage device and an advertisement service central sever. The advertisement Portal sever provides an advertiser service access interface and an advertisement service user access interface, receives an advertiser information and advertiser advertisement information including advertisement contents and an advertisement mode uniformly, further receives user information and subscription information set by the user uniformly, and stores such information into the data storage device. The advertisement Portal sever further sends the advertisement information to the advertisement service central sever. The advertisement service central server transfers the advertisement information including advertisement contents to each service application system according to the advertisement mode in the advertisement information.

Thus the share of information resources is realized. User registration information, subscription information, advertisement information and the like may be shared between various service application systems. The advertisement service users may register and configure the subscription information in the system for publishing advertisement service information uniformly. And the advertisement service user only needs to configure service application systems through which advertisement information is received when registering without registering respectively in various service application systems. Therefore, the operations for the advertisement service users become easy and the waste of the system resources reduces. Similarly, the advertisers input advertisement information to the system for publishing advertisement service information, which sends the advertisement contents to the target user through various service application systems according to the advertisement mode. Thus both the cost for publishing advertisement and the waste of system resources reduce, and the advertisement publishing in various service application systems can be controlled uniformly The system for publishing advertisement service information in accordance with the present invention may not only connect with multiple service application systems but also be casecaded with another system for publishing advertisement service information, which enhances the share of information.

Additionally, the system for publishing advertisement service information in accordance with the present invention may also be configured with an advertisement gateway to implement protocol conversion, thereby advertisement information may be published through service application systems with different communication protocols, and the system for publishing advertisement service information has good extensibility.

DETAILED DESCRIPTION OF THE INVENTION

Embodiments of the present invention are hereinafter further described in detail with reference to the accompanying drawings so as to make technical schemes and merits of the present invention clearer.

A system for publishing advertisement service information is set on networks according to a system and a method for publishing advertisement service information in accordance with embodiments of the present invention. All advertisement service users register and configure subscription information uniformly in a system for publishing advertisement service information. Advertisers uniformly inputs advertisement information to the system for publishing advertisement service information. The system for publishing advertisement service information publishes advertisement contents to a target user through various service application systems of a network according to the advertisement information.

There may be multiple implementations of the present invention, and three embodiments are hereinafter described in detail with reference to accompanying drawings.

Figure 1:
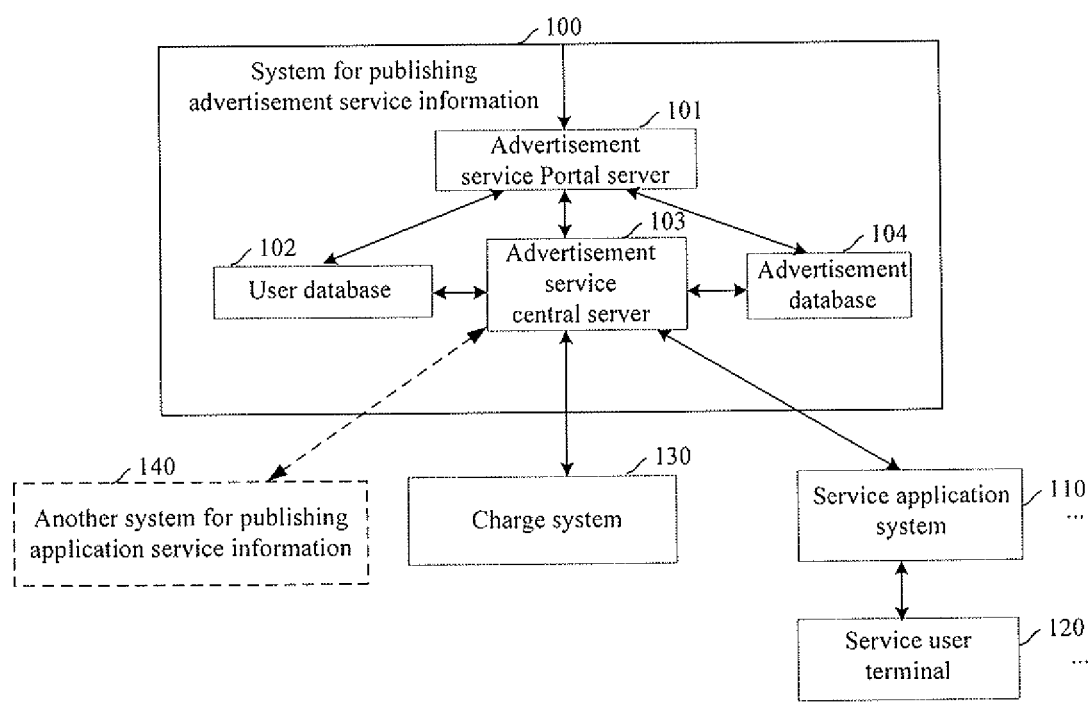
FIG. 1 is a schematic diagram illustrating the architecture and connecting relationship of a system for publishing advertisement service information according to a first embodiment of the present invention.

Refer to FIG. 1, which is a schematic diagram illustrating the architecture and connecting relationship of a system for publishing advertisement service information according to a first embodiment of the present invention. The system for publishing advertisement service information 100 in accordance with the embodiment includes an advertisement service Portal server 101, a user database 102, an advertisement database 104 and an advertisement service central server 103.

The advertisement service Portal server 101 provides a service access interface for advertiser and advertisement service user, receives advertiser information and advertisement information including advertisement contents and an advertisement mode, and saves the advertiser information and the advertisement information into the advertisement database 104. Or, the advertisement service Portal server 101 receives user information of the advertisement service user and the subscription information configured by the advertisement service user, saves the user information into the user database 102, and receives advertiser information and advertisement information from the advertiser, and saves the advertiser information and advertisement information into the advertisement database 104. The user database 102 and the advertisement database 104 are set in a data storage device. The advertisement mode may be set as one or more of the following modes:

a) setting a user list, according to which an advertisement is published to users;

b) setting a condition that a user attribute should meet, according to which an advertisement is published to the users of which user attributes meet the condition;

c) setting a publishing condition unrelated to user attributes, according to which an advertisement is published when the publishing condition is met;

d) setting a target service type of advertisements or a service application system, according to which an advertisement is limited to be published in services of the target service type or in the service application system.

In this embodiment, the advertiser, the advertisement service user and an operator may access the advertisement service Portal server 101 using a Web browser.

The advertisement service central server 103 acquires advertisement information from the advertisement database 104, transfers the advertisement contents to the service application system 110 or another system for publishing advertisement service information 140 according to the advertisement mode in the advertisement information, generates and stores, when transferring the advertisement contents, a Charging Data Record (CDR) which is acquired by an external charge system 130 when charging.

The service application system 110 sends the advertisement contents to an advertisement service user terminal 120.

Figure 2:
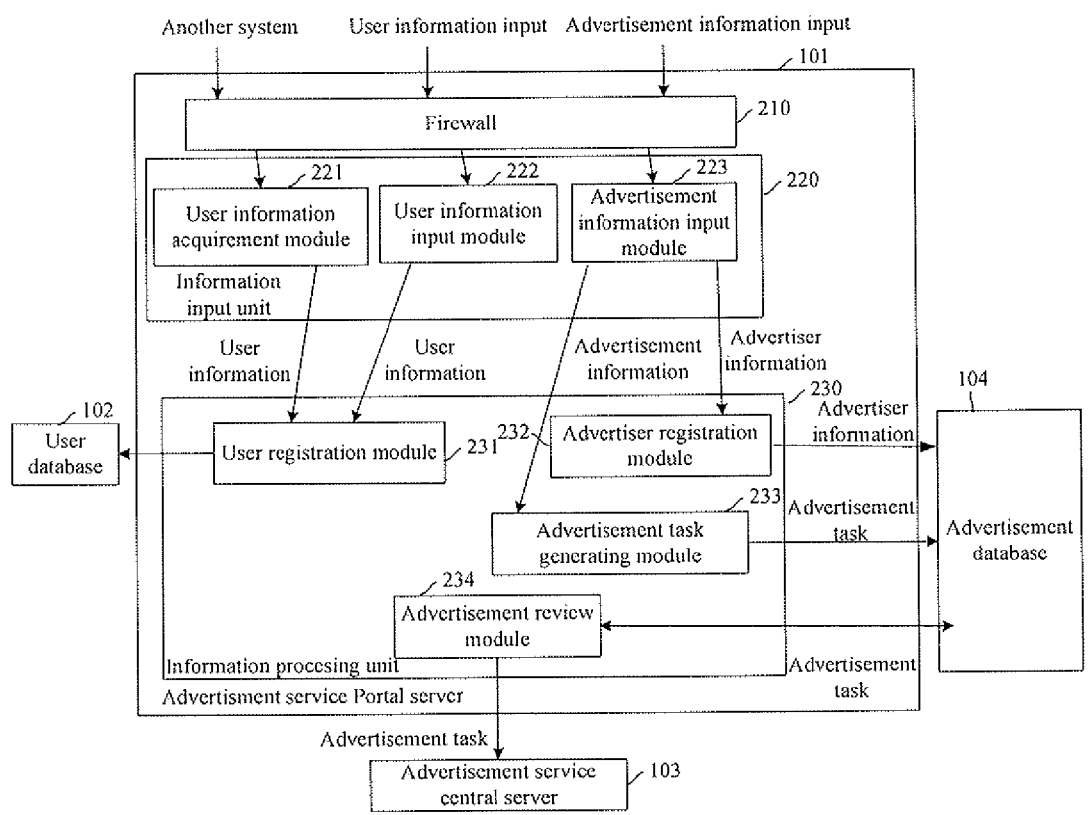
FIG. 2 is a schematic diagram illustrating the architecture and connecting relationship of an advertisement service Portal server according to the embodiment illustrated in FIG. 1

Refer to FIG. 2, which is a schematic diagram illustrating the architecture and connecting relationship of an advertisement service Portal server in accordance with the embodiment illustrated in FIG. 1. The advertisement service Portal Server 101 in accordance with this embodiment includes a firewall 210, an information input unit 220, and an information processing unit 230.

The firewall 210 filters the information input from outside, which enhances security.

The information input unit 220 in accordance with the present invention includes a user information acquirement module 221, a user information input module 222, and an advertisement information input module 223.

In the user information acquirement module 221, an interface is configured for acquiring a user attribute from various service application systems and operation support systems, and through the interface, the user information acquirement module 221 accesses directly or indirectly databases of various service application systems and operation support systems to acquire user information such as a user attribute, sends the user information to the information processing unit 230.

The user attribute may contain some or all of the following information: personal basic information (for example, birthday, blood type, gender and so on), various contact modes (such as via a cell phone number, a fixed phone number, an address, an email address and the like), hobbies, settings for receiving advertisements (for instance, an advertisement type that a user is willing to receive, a time period, a frequency and a preferential mode), a service used by the user; and the user information after data mining and trimming (such as use frequency and time period of the service, consumption capability and so on).

The user information acquirement module 221 in accordance with this embodiment is set to realize the share of user attribute information of the various service application systems and operation support systems, and there may be no user information acquirement module 221 in practical applications.

The user information input module 222 provides a user Web interface through which the advertisement service user receives the user information and the subscription information and sends the user information and the subscription information to the information processing unit 230.

The advertisement information input module 223 provides an advertiser Web interface through which the advertiser receives advertiser information and advertisement information including advertisement contents and an advertisement mode, and sends the information received to the information processing unit 230. The advertisement information is set by the advertiser.

The information processing unit 230 in accordance with this embodiment includes a user registration module 231, an advertiser registration module 232, an advertisement task generating module 233 and an advertisement examining module 234.

The user registration module 231 receives the user information and the subscription information from the user information acquirement module 221 and the user information input module 222, creates an account number corresponding to the user information and the subscription information, receives various user information registered or updated and saves the user information registered or updated into the user database 102.

The advertiser registration module 232 receives the advertiser information from the advertisement information input module 223, creates a second account number corresponding to the advertiser information, receives various advertiser information registered or updated and saves the advertiser information registered or updated into the advertisement database 104.

The advertisement task generating module 233 receives the advertisement information including advertisement contents and an advertisement mode from the advertisement information input module 223, generates advertisement tasks according to the advertisement mode and saves the advertisement tasks into the advertisement database 104.

The advertisement tasks may include such task information as a task number, input time, an advertisement provider, an advertisement title, advertisement contents or advertisement content location (advertisement contents may be stored in the advertisement database 104 independently), an advertisement mode, an examining state, an implementing status, sources (local or another system for publishing advertisement service information) and so on.

The advertisement examining module 234 acquires the advertisement tasks from the advertisement database 1045 examines the advertisement tasks, and sends the advertisement tasks which pass the examining to the advertisement service central server 103.

The advertisement examining module 234 may include an automatic examining program which queries the advertisement database 104 periodically to obtain the advertisement tasks and examines the advertisement tasks automatically, and further sets flags showing whether the advertisement tasks have passed the examining. The flag of the advertisement tasks may show three examining states, i.e., not-examined, passing-examining, and rejected. The initial state of the advertisement tasks is set as not-examined and only the advertisement task of which the examining state is passing-examining may be sent to the advertisement service central server 103 to be processed. There are large quantities of automatic examining methods, among which one method may be that a filtered keyword is set and the advertisement task including ill keyword information will be automatically rejected, that is, the examining state is set as rejected.

The advertisement examining module 234 may provide an examining interface for management personnel of operators to examine the advertisement tasks. The examining interface may be a Web interface through which management personnel of the operators may examine the advertisement tasks manually. The Web interface queries the advertisement database 104 to obtain the advertisement tasks and displays the advertisement tasks in a webpage format. Meanwhile, the Web interface receives examining information from management personnel and updates the examining state of the advertisement tasks according to the examining information.

In addition, the advertisement examining module 234 may further set priority for the advertisement tasks. An advertisement task with higher priority and in the examining state of passing-examining will be sent to the advertisement service central server 103 preferentially to be processed.

The advertisement examining module 234 is set in accordance with an embodiment of the present invention to guarantee the realities and health of advertisements. Actually, the present invention may also be implemented without the advertisement examining module 234, or when the operator of the system for publishing advertisement service information trusts in the advertisers very much, the advertisement examining module 234 is not set either, and the advertisement tasks may be acquired directly from the advertisement database 104 and sent to the advertisement service central server 103.

In this embodiment, the advertiser, operator, and advertisement service user all have their own account numbers and may be configured with access authorities corresponding to the account numbers. Moreover, the advertiser, operator and advertisement service user may acquire, through the advertisement service Portal server 101 according to the access authorities of their own account numbers, information of the advertisement service user in the user database 102, and information in the advertisement database 104 such as advertisement contents, advertisement modes, advertisement tasks and the like.

Figure 3:
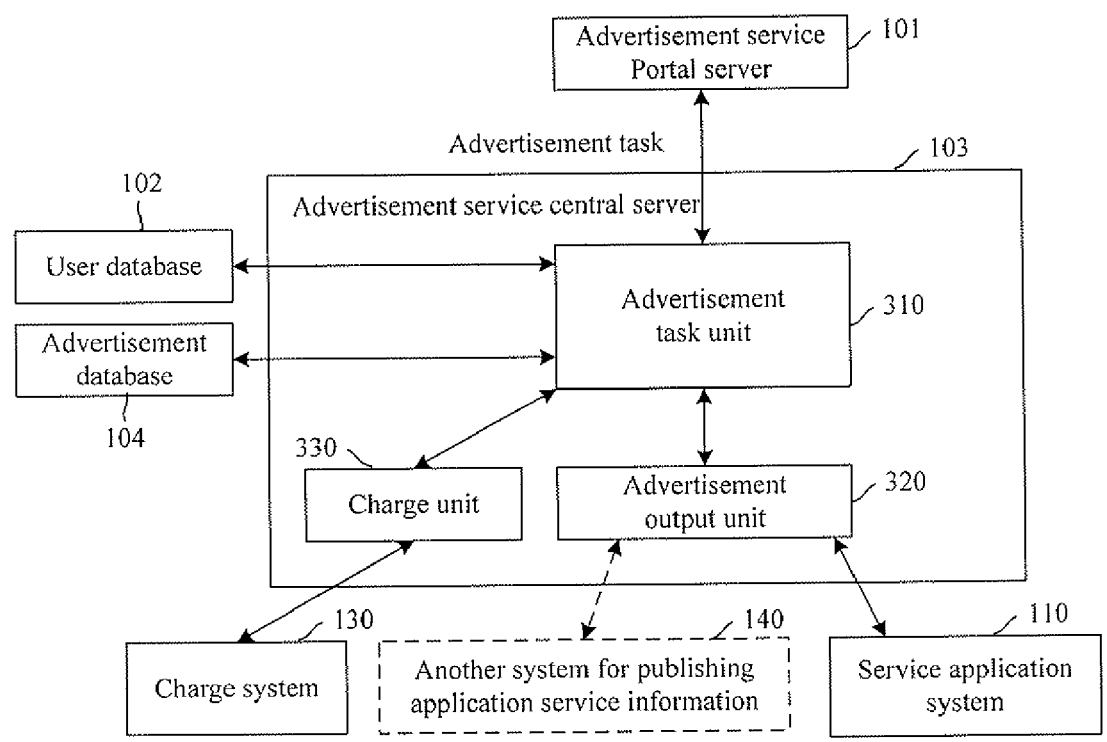
FIG. 3 is a schematic diagram illustrating the architecture and connecting relationship of an advertisement service central server according to the embodiment illustrated in FIG. 1.

Refer to FIG. 3, which is a schematic diagram illustrating the architecture and connecting relationship of an advertisement service central server in accordance with the embodiment illustrated in FIG. 1. The advertisement service central server 103 in accordance with this embodiment includes a task unit 310, an advertisement output unit 320 and a charge unit 330.

The advertisement task unit 310 in accordance with this embodiment receives the advertisement task which passes the examining from the advertisement service Portal server 101 or queries the advertisement database 104 in the database storage device to acquire the advertisement tasks of which the flags show the examining state of "passing-examining". Moreover, upon arraying the advertisement tasks, the advertisement task unit 310 puts the advertisement tasks into an advertisement task queue created in advance, and acquires the advertisement tasks in turn from the advertisement task queue, or acquires a second advertisement task from the advertisement task queue during processing a first advertisement task. Furthermore, the advertisement task unit 310 queries the user database 102 according to the advertisement mode in the advertisement tasks to acquire a target user address. The advertisement task unit 310 queries the advertisement database 104 to acquire the advertisement task mode, decides a target service application system/target system for publishing advertisement information according to the advertisement task mode, and acquires advertisement contents from the advertisement database 104. And the advertisement task unit 310 sends the target user address, the target service application system/target system for publishing advertisement service information and the advertisement contents to the advertisement output unit 320, and implements the advertisement tasks. Upon implementing the advertisement tasks, the advertisement task unit 310 also sends the information included in the advertisement tasks to the charge unit 330, such as the task information, the target user address, the target service application system/target system for publishing advertisement service information and the like.

The advertisement output unit 320 in accordance with this embodiment receives the target user address, target service application system/target system for publishing advertisement service information and advertisement contents from the advertisement task unit 310, and outputs advertisement information including the target user address, advertisement contents and the like to the target service application system 110 or another system for publishing advertisement service information 140.

The interfaces between the advertisement service central server 103 and the service application system 110 in accordance with this embodiment may be classified into two types; Push interfaces and Pull interfaces, according to a transmit mode. The advertisement output unit 320 in the advertisement service central server 103 may include one or both of the two types of interfaces. The Push interfaces push such advertisement information as advertisement contents and the like to the service application system 110 initiatively, and the Pull interfaces provide such advertisement information as advertisement contents and so on according to a request from the service application system 110. The advertisement information may include the advertisement contents, the target user address, and the like. The service application system 110 provides the advertisement contents for a user terminal according to the target user address.

The charge unit 330 in accordance with this embodiment stores various charge modes, upon receiving information from the advertisement task unit 310, finds a charge mode according to the information received, and generates a Charging Data Record (CDR) and stores the CDR.

The charge modes refer to the modes by which the system for publishing advertisement service information 100 charges the target user who receives advertisements. In this embodiment, the charge mode data is stored in the charge unit 330, but, in practical application, it may also be stored in the user database 102 or the advertisement database 104. The charge modes may be configured by the advertiser when the advertisement mode is configured. Alternatively, the charge mode may also be chosen and configured by the advertisement service user who subscribes to the advertisements according to his/her desire. The charge modes configured by the advertiser may be stored in the advertisement database 104 as a parameter of the advertisement mode, and the charge mode chosen and configured by the advertisement service user may be stored in the user database 102 as the user information. The charge modes include but are not limited to the following contents:

x) a preferential fee set for each advertisement received;

y) a preferential fee set for advertisements received monthly, that is, a fixed monthly fee; generally, an upper-limit of the number of advertisements received by the advertisement service user monthly or a frequency for receiving the advertisements monthly should be designated;

z) a rate set for the advertisements received from different service application systems.

The Charging Data Record (CDR) may include a task number, a service application system address, an account number or address of the advertisement service user, a preferential fee, and occurring time and the like. The contents, formats, and storage formats and the like of the CDR may refer to charging data records, i.e., bills, of various service application systems.

The charge system 130 may acquire the CDR from the charge unit 330 through a File Transfer Protocol (FTP) interface or the like. The charge system 130 may be a charge system adopted in the service application system 110, which combines and trims the CDR in the charge unit 330 and the CDR in each other service application system 110 periodically, for example monthly, deducts the fees, and provides the fee information to the advertisement service user.

In fact, it is not necessary to charge in the system for publishing advertisement service information 100, the charging may be performed in each service application system 110, which generates the CDR while sending an advertisement to the user terminal. A discount may be given to the advertisement service user receiving the advertisement; the charging may be without the discount either, for example when charging for the advertisement which is a commonweal advertisement.

Figure 4:
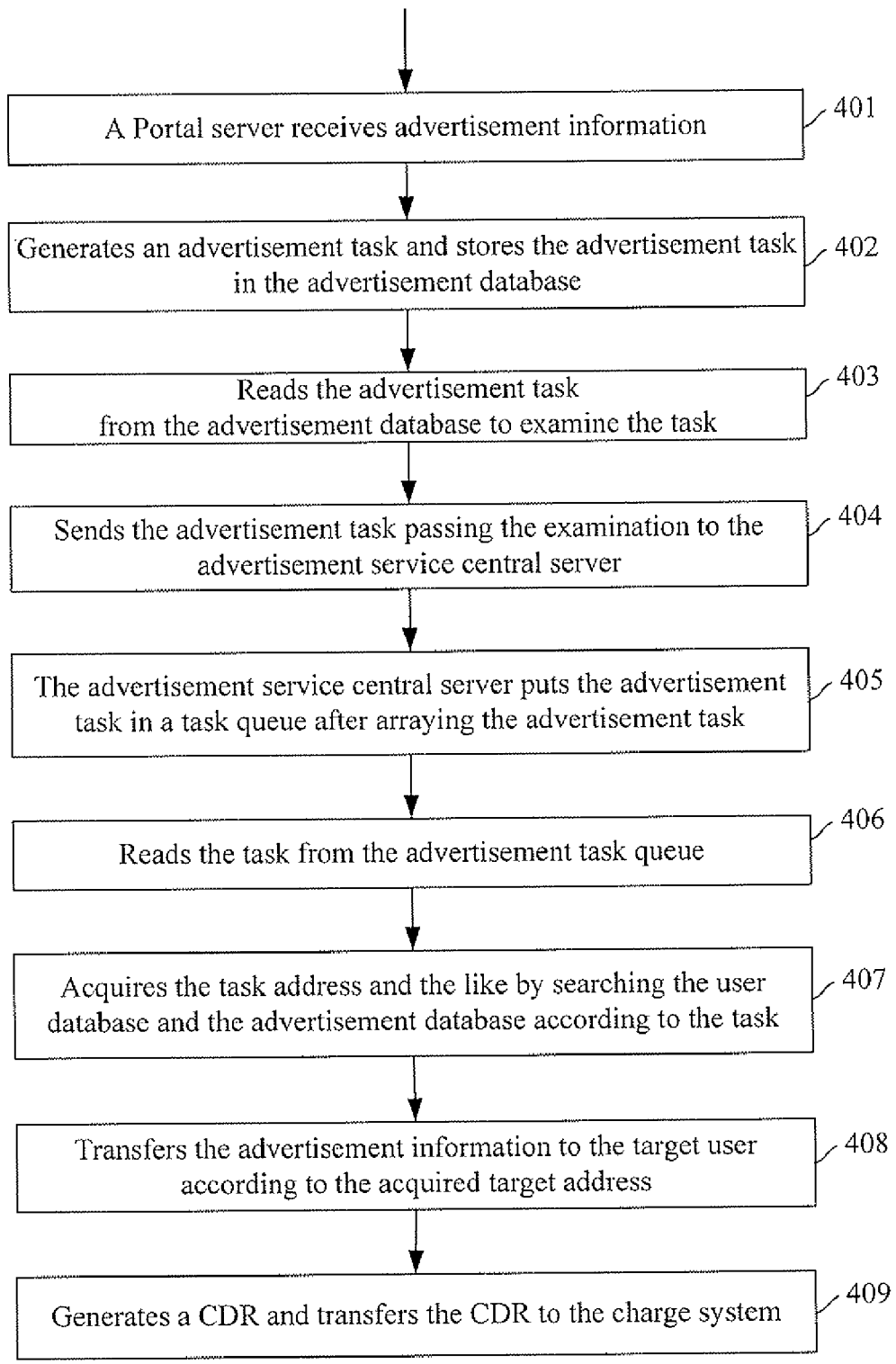
FIG. 4 is a schematic flowchart illustrating the system for publishing advertisement service information according to the embodiment illustrated in FIG. 1 publishing an advertisement.

Refer to FIG. 4, which is a schematic flowchart illustrating the system for publishing advertisement service information which is in accordance with the embodiment illustrated in FIG. 1 publishing an advertisement. The process includes the following processes.

Step 401: an advertisement service Portal server receives advertisement information including advertisement contents and an advertisement mode provided by an advertiser.

Step 402: the advertisement service Portal server generates advertisement tasks according to the advertisement information received and saves the advertisement tasks into an advertisement database.

Step 403: the advertisement service Portal server acquires the advertisement tasks from the advertisement database, and examines the advertisement tasks.

Step 404: the advertisement service Portal server sends the advertisement tasks passing the examining to an advertisement service central server.

Step 405: the advertisement service central server puts the advertisement tasks received into an advertisement task queue.

Step 406: the advertisement service central server acquires the advertisement tasks from the advertisement task queue in turn or acquires a second advertisement task during processing a first advertisement task.

Step 407: the advertisement service central server queries a user database and an advertisement database according to the advertisement mode in the advertisement tasks, and acquires such information as a target user address, a target service application system/target system for publishing advertisement service information, the advertisement contents and the like.

Step 408: the advertisement service central server sends the target user address and the advertisement information including the advertisement contents to the target service application system/target system for publishing advertisement service information according to the information of the target service application system/target system for publishing advertisement service information.

Step 409: the advertisement service central server generates a CDR and sends the CDR to a charge system.

In the process above, the advertisement service Portal server sends the advertisement tasks passing the examining to the advertisement service central server. In practical applications, the advertisement service central server may also query the advertisement database in the data storage device to acquire the advertisement tasks of which the flags show the examining state as passing-examining.

Figure 5:
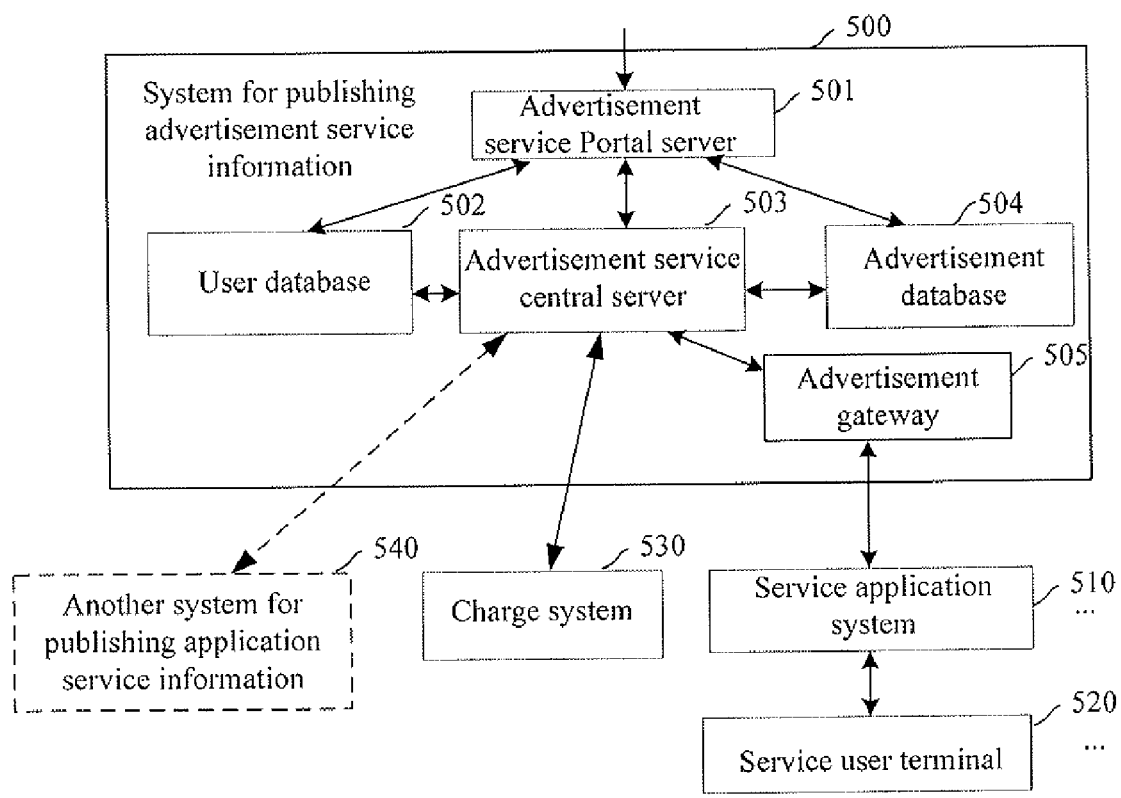
FIG. 5 is a schematic diagram illustrating the architecture and connecting relationship of a system for publishing advertisement service information according to a second embodiment of the present invention.

Refer to FIG. 5, which is a schematic diagram illustrating the architecture and connecting relationship of a system for publishing advertisement service information according to a second embodiment of the present invention. The system for publishing advertisement service information 500 in accordance with this embodiment includes an advertisement service Portal server 501, a user database 502, an advertisement service central server 503 and an advertisement database 504 which are the same as those in accordance with the first embodiment, and an advertisement gateway 505.

The advertisement gateway 505 is set between the advertisement service central server 503 and the service application system 510, and is configured to implement protocol conversion for information transferred between the advertisement service central server 503 and the service application system 510.

The advertisement service central server 503 in accordance with this embodiment sends, to the advertisement gateway 505, not only the advertisement information including the target user address and the advertisement contents, but also the address of the target service application system 510, or the name, the type and the other information of the target service application system 510.

The advertisement gateway 505 may be configured in multiple ways. Two exemplary configurations will be described in detail hereinafter.

Figure 6:
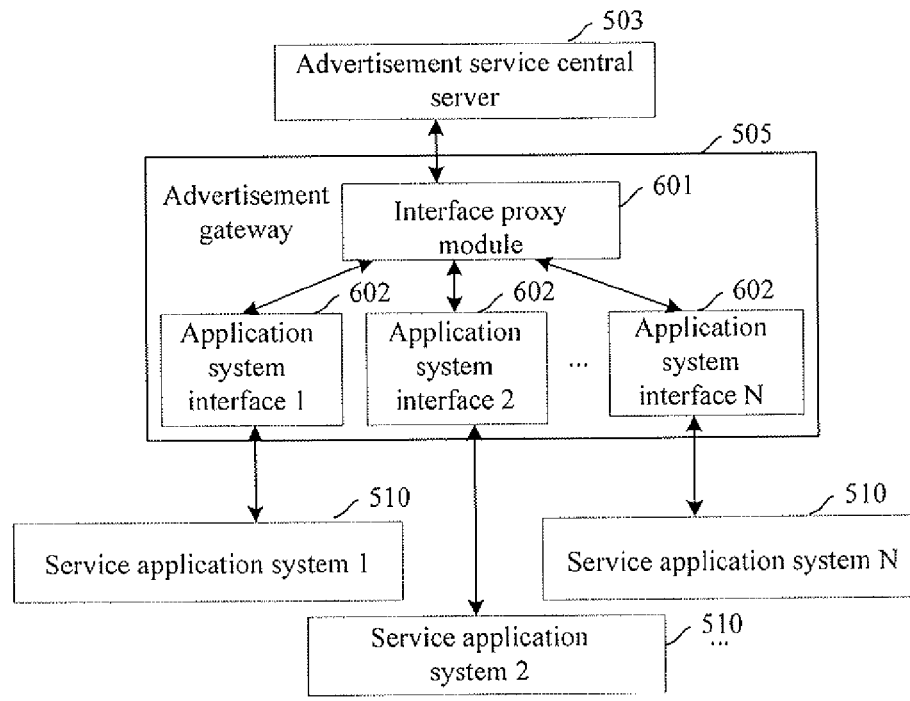
FIG. 6 is a schematic diagram illustrating the first architecture and connecting relationship of an advertisement gateway according to the second embodiment illustrated in FIG. 5.

In a first exemplary configuration, as shown in FIG. 6, which is a schematic diagram illustrating the architecture and connecting relationship of the advertisement gateway in accordance with the embodiment illustrated in FIG. 5, the advertisement gateway 505 includes an interface proxy module 601 and N application system interfaces 602. N represents the number of types of the service application systems and one application system interface 602 is connected with one service application system 510.

In the interface proxy module 601, information of various service application systems 510 is stored, including the name, the type, the address of the service application systems, and the interface protocols which are used to communicate with the system for publishing advertisement service information

500. Upon receiving the information from the advertisement service central server 503, the interface proxy module 601 acquires an interface protocol according to the information of the service application systems and the information of the target service application system sent from the advertisement service central server 503, chooses an application system interface according to the interface protocol, and sends the advertisement information including the advertisement contents and the target user address to the target service application system 510.

Figure 7:
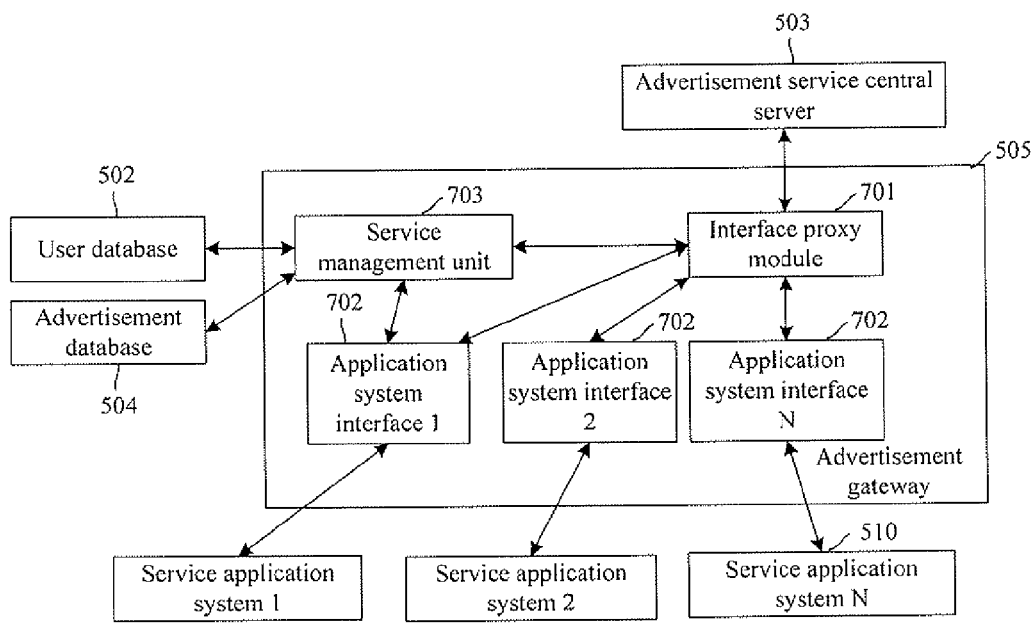
FIG. 7 is a schematic diagram illustrating the second architecture and connecting relationship of the advertisement gateway according to the second embodiment illustrated in FIG. 5.

In a second exemplary configuration, as shown in FIG. 7, which is a schematic diagram illustrating the architecture and connecting relationship of the advertisement gateway in accordance with the embodiment illustrated in FIG. 5, the advertisement gateway 505 includes a service management unit 703, an interface proxy module 701 and N application system interfaces 702.

The service management unit 703 generates a service report according to the data in the user database 502, the data in the advertisement database 504 and the like, such as a daily report and a monthly report based on time, which includes statistics on the information including the amount of the advertisements sent, the type of the advertisements sent, the target user, the advertiser and the like.

The service management unit 703 may further inquires and monitors the flow of the advertisement gateway and the load of the system resources, configures an upper-limit of the flow for each interface or an upper-limit of the system resources occupied, implements the configuration of connecting with the service application system such as configuring the address, the port number, the account number of access and the like of the service application system.

The process of publishing advertisements in accordance with this embodiment is similar to that illustrated in FIG. 4. What is different is that the advertisement information from the advertisement service central server is forwarded by the advertisement gateway to the service application system.

Figure 8:
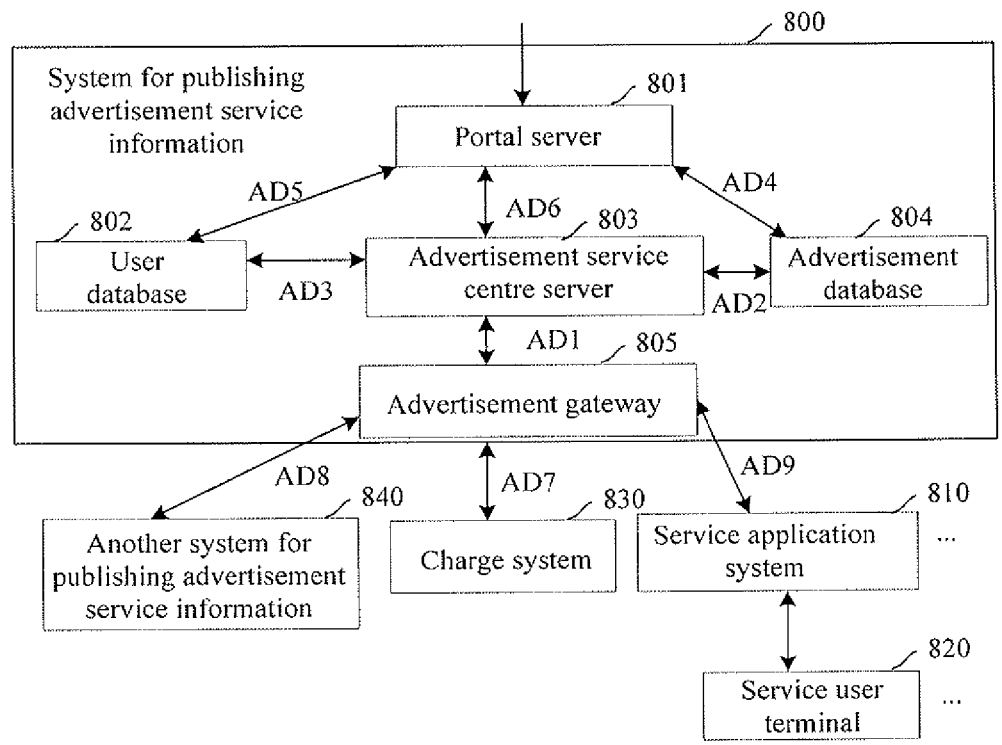
FIG. 8 is a schematic diagram illustrating the architecture and connecting relationship of a system for publishing advertisement service information according to a third embodiment of the present invention.

Refer to FIG. 8, which is a schematic diagram illustrating the architecture and connecting relationship of a system for publishing advertisement service information according to a third embodiment of the present invention. The system for publishing advertisement service information 800 includes an advertisement service Portal server 801, a user database 802, and an advertisement database 804 which are the same as those described in the first embodiment and the second embodiment, so there is no more description.

FIG. 8 illustrates the connection protocols between each network element. Interfaces from AD1 to AD6 are the internal interfaces of the system for publishing advertisement service information, and the interfaces may be implemented based on TCP/IP.

AD7, AD8 and AD9 are external interfaces.

AD7 is used to transfer a CDR of a system for publishing advertisement service information to a charge system using FTP or a dedicated protocol.

AD8 is used to realize intercommunications between systems for publishing advertisement service information, i.e., to transmit advertisement information between systems for publishing advertisement service information, which may be implemented based on TCP/IP or the dedicated protocol defined.

AD9 is related to the service application system, which may use multiple interface protocols such as an MM7 protocol, a China Mobile Peer to Peer (CMPP) protocol and the like, or the dedicated protocol defined to transmit advertisement information from the system for publishing advertisement service information to the service application system.

In this embodiment, the advertisement service central server 803 and the advertisement gateway 805 differ from those in accordance with the second embodiment, which will be described respectively.

Figure 9:
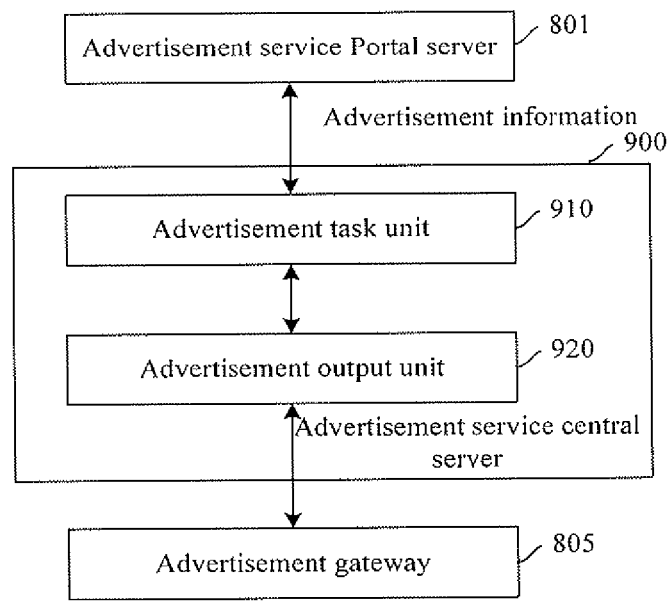
FIG. 9 is a schematic diagram illustrating the architecture and connecting relationship of an advertisement service central server according to the third embodiment illustrated in FIG. 8.

Refer to FIG. 9, which is a schematic diagram illustrating the architecture and connecting relationship of an advertisement service central server in accordance with the embodiment illustrated in FIG. 8. The advertisement service central server 900 includes an advertisement task unit 901 and an advertisement output unit 920.

The advertisement task unit 910 implements the advertisement tasks and the process is the same as that implemented by the advertisement task unit 301 in FIG. 3. Upon implementing the advertisement tasks, the advertisement task unit 910 sends the information included in the advertisement tasks to the advertisement gateway 805, such as the task information, target user address, target service application system/target systems for publishing advertisement service information and the like.

Figure 10:
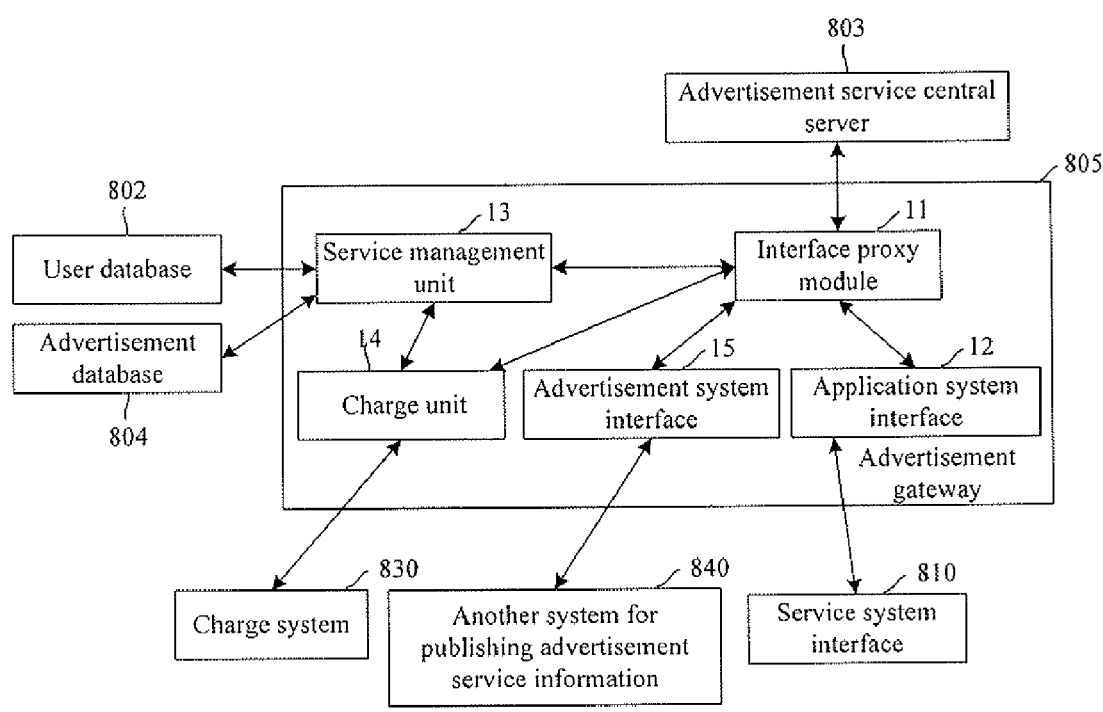
FIG. 10 is a schematic diagram illustrating the architecture and connecting relationship of an advertisement gateway according to the third embodiment illustrated in FIG. 8.

Refer to FIG. 10, which is a schematic diagram illustrating the architecture and connecting relationship of the advertisement gateway in accordance with the embodiment illustrated in FIG. 8. The advertisement gateway 10 includes a charge unit 14, an advertisement system interface 15, an interface proxy module 11, an application system interface 12 and a service management unit 13.

The interface proxy module 11 receives the information included in the advertisement tasks from the advertisement service central server 803, such as the task information, target user address, target service application system/target systems for publishing advertisement service information and the like, and sends the information received to the charge unit 14.

The charge unit 14 generates a CDR according to the information received, and the charge system 830 inquires about the CDR. The method of generating the CDR by the charge unit 14 is the same as that by the charge unit 330 in the advertisement service central server 103 in the first embodiment, so there is no more description. The charge unit 14 further accepts the inquiring from the service management unit 13, and sends the CDR to the service management unit 13 which implements statistics and backup for the CDR.

The advertisement system interface 15 has the same functions as the application system interface 12. What differs from the application system interface 12 is that the advertisement system interface 15 adopts the communication protocol of another system for publishing advertisement service information 840.

In fact, if the communication protocol adopted by the system for publishing advertisement service information 800 is the same as that adopted by another system for publishing advertisement service information 840, the intercommunications between the system for publishing advertisement service information 800 and another system for publishing advertisement service information 840 may be implemented between the advertisement service central servers of the two systems for publishing advertisement service information directly without through the advertisement gateway 10, or through one advertisement gateway or two advertisement gateways.

The intercommunications between the systems for publishing advertisement service information without through any advertisement gateway are as follows:

an advertisement service central server is connected with another advertisement service central server directly.

The intercommunications between the systems for publishing advertisement service information through one advertisement gateway are as follows:

an advertisement service central server is connected with another advertisement service central server through one advertisement gateway.

The intercommunications between the systems for publishing advertisement service information through two advertisement gateways are as follows:

an advertisement service central server is connected with a first advertisement gateway which is connected with a second advertisement gateway, and the second advertisement gateway is connected with another advertisement service central server The advertisement gateway 805 in this embodiment may also implement flow control to avoid overload of the service application system 810, the system for publishing advertisement service information 800 or communication networks, which guarantees the system stability and avoids the system down resulted from the instability The flow control may be implemented by the following methods.

In one method, the service application systems 810 send the information of their load to the advertisement gateway 805 in the system for publishing advertisement service information periodically. The advertisement gateway 805 adjusts the flow of advertisements sent to the service application systems 810 according to the information of their load to avoid overload of each service application system.

In another method, the service management unit 13 monitors the load of the advertisement gateway 805. If the load exceeds the maximum load that the advertisement gateway 805 may process, the service management unit 13 alerts and returns a message to the advertisement service central server 803, which adjusts the advertisement tasks, i.e., adjusts the flow of advertisements sent to the advertisement gateway 805 according to the message. An adjustment method, for example, may be to send an advertisement with higher priority preferentially such as a business advertisement or an urgent notification advertisement.

In yet another method, an upper-limit of the flow for each interface or an upper-limit of system resources occupied such as memories or CPUs and the like is preset. When either of the upper-limits above is exceeded, a message is returned to the advertisement service central server 803, which adjusts the advertisement tasks according to the message.

The advertisement gateway 805 further buffers a request for sending advertisements when the system for publishing advertisement service information 800 is adjusting the flow of advertisements, and processes the request when the flow is normal.

The advertisement gateway 505 in the second embodiment may also realize flow control using the same methods mentioned above.

The process of publishing advertisements in accordance with this embodiment is also similar to that illustrated in FIG. 4, what is different is that the advertisement information from the advertisement service central server is forwarded by the advertisement gateway to the service application system.

The service application system mentioned in the three embodiments above may be an SMS system, a multimedia message system, a voice service system, a game service system, an email system, a steam media service system, a customized ring system, an instant message system, a digital TV system and the like. An advertisement information interface unit may be set in these service application systems to receive advertisement information including advertisement contents from the systems for publishing advertisement service information.

The user terminal in the three embodiments above may be a fixed telephone, a mobile telephone, a Personal Digital Assistant (PDA), a computer or a TV, etc.

The service application system in accordance with the present invention is more applicable to an SMS system and a multimedia message system. Since there are different operators, one service application system may adopt different protocols. For example, with respect to the SMS system, the operator may provide a CMPP or an SGIP. And short messages in fixed networks from different operators also use different protocols. In practical application, a system for publishing advertisement service information is generally of the architecture illustrated in the second embodiment or the third embodiment, that is, of the architecture including an advertisement gateway.

Figure 11:
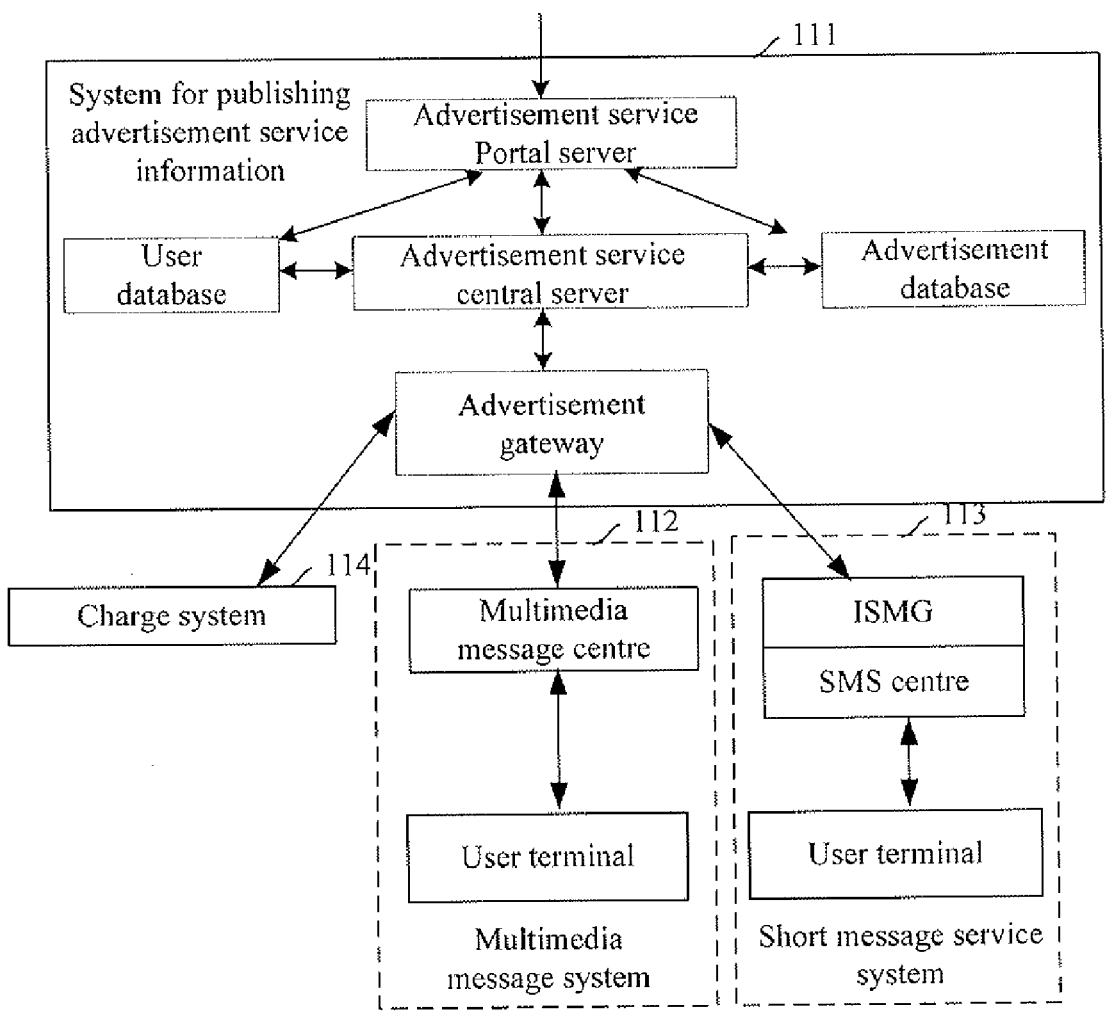
FIG. 11 is a schematic diagram illustrating a first connection between the system for publishing advertisement service information and a multimedia message system, and between the system for publishing advertisement service information and a Short Message Service (SMS) system according to the third embodiment illustrated in FIG. 8.

Refer to FIG. 11, which is a schematic diagram illustrating a first connection between the system for publishing advertisement service information and a multimedia message system and between the system for publishing advertisement service information and an SMS system in accordance with the embodiment illustrated in FIG. 8. The advertisement gateway of the system for publishing advertisement service information 111 intercommunicates with the multimedia message centre of multimedia message system 112 through an MM7 protocol to send advertisement information including advertisement contents to the user terminal in a multimedia message format. The advertisement gateway intercommunicates with an Internet Short Message Gateway (ISMG) of the SMS system 113 through a CMPP/SGIP to send the advertisement information including advertisement contents to the SMS centre through the ISMG, the SMS centre sends the advertisement information including advertisement contents to the user terminal in a short message format.

In addition, a multimedia message gateway may be set in front of the multimedia message centre, which is not illustrated in FIG. 11. A description is illustrated herein based on FIG. 11, and other structures such as including the multimedia message centre are similar.

Figure 12:
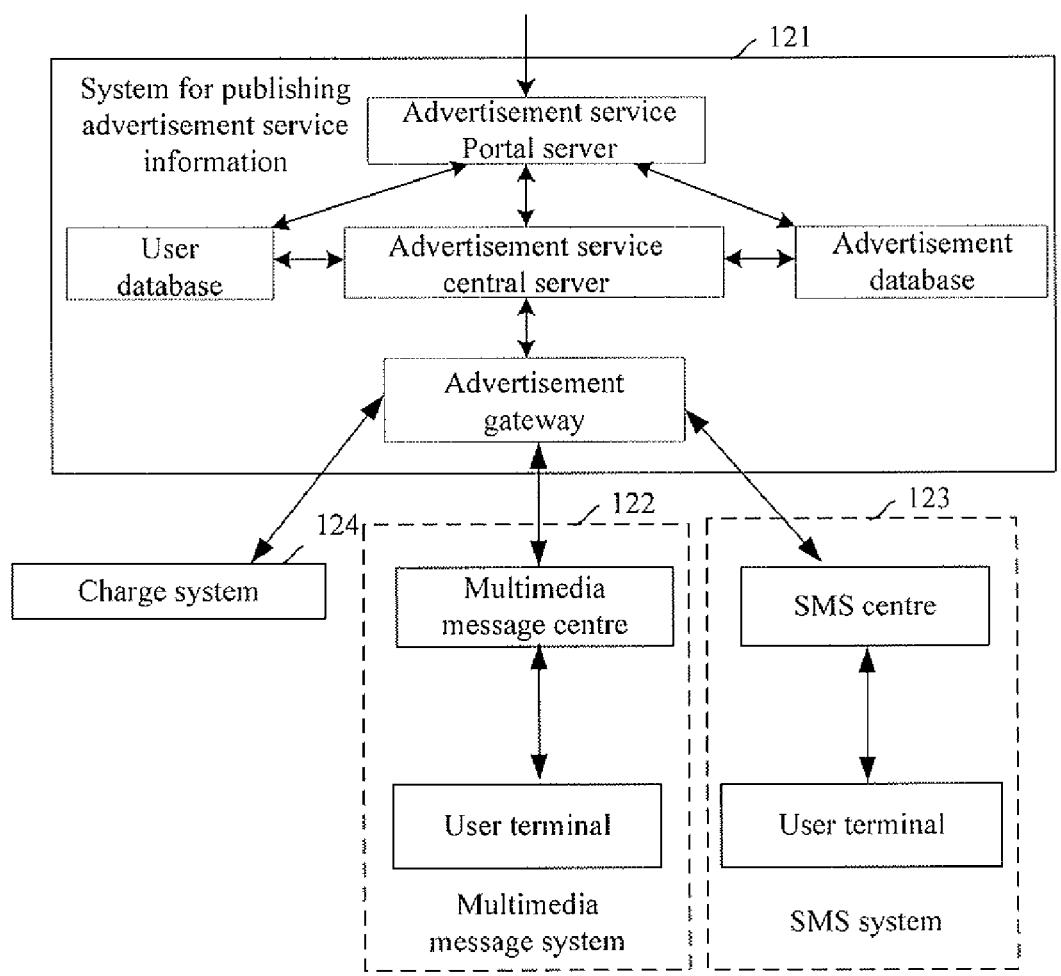
FIG. 12 is a schematic diagram illustrating a second connection between the system for publishing advertisement service information and a multimedia message system, and between the system for publishing advertisement service information and an SMS system according to the embodiment illustrated in FIG. 8.

Since there is great information capability in advertisement short messages, it is not so reasonable for the advertisement short messages to share devices, such as an ISMG, an SMS centre and the like, with other services. Therefore, the ISMG in the SMS system may be removed, and the SMS centre is changed into a PUSH SMS centre which is used only to send advertisement short messages but not to receive short messages. And the system for publishing advertisement service information communicates with the SMS centre by an SMPP. Refer to FIG. 12, which is a schematic diagram illustrating a second connection between the system for publishing advertisement service information and an SMS system in accordance with the embodiment illustrated in FIG. 8. The advertisement gateway in the system for publishing advertisement service information 121 intercommunicates with an SMS centre in an SMS system 123 by the SMPP. The SMS centre sends advertisement information including advertisement contents to the user terminal in a short message format.

It may be seen from the above embodiments that, the system and the method for publishing advertisement service information in accordance with embodiments of the present invention realize share of information resources of various service application systems. An advertisement service user may register and configure the subscription information in the system for publishing advertisement service information uniformly, that is, the advertisement service user need only configure which one or which service application systems the advertisement service user is to receive advertisement information from when registering instead of registering respectively in various service application systems. Thus the operation becomes easy to the advertisement service user, and a waste of the system resources reduces. Similarly, advertisers input advertisement information to the system for publishing advertisement service information uniformly, which sends advertisement contents to the target user through various service application systems according to the advertisement mode. Therefore, the cost for publishing advertisement as well as the waste of system resources reduces, and the advertisement publishing in various service application systems may be managed uniformly.

The system for publishing advertisement service information in accordance with the present invention may be connected with multiple service application systems as well as cascaded with another system for publishing advertisement service information, which further enhances share capacity of information.

Additionally, the system for publishing advertisement service information in accordance with the present invention may also be configured with an advertisement gateway to implement protocol conversion, thereby advertisement information could be published through service application systems with different communication protocols and the system for publishing advertisement service information has good extensibility.

The foregoing description is only preferred embodiments of the present invention, and is not to be used to limit the protection scope thereof. Any modification, equivalent replacement and improvement based on the principle and spirit of the invention should be covered within the protection scope of the invention.

What is claimed is:

1. A system for publishing advertisement service information, comprising:
   an advertisement service Portal server, receiving advertisement information including advertisement contents and an advertisement mode from an advertiser;
   a data storage device, storing the advertisement information including the advertisement contents and the advertisement mode; and
   an advertisement service central server, acquiring the advertisement information including the advertisement contents and the advertisement mode from the data storage device, determining, according to the advertisement mode, a service application system from among at least two service application systems which provide different service applications, and transferring the advertisement information including the advertisement contents to the determined service application system which provides the advertisement mode contents for a user terminal;
   wherein said advertisement mode comprises at least one of:
      a user list, using according to which an advertisement is published to users;
      a condition that user attributes should meet, according to which an advertisement is published to the users of which attributes meet the condition;
      a publishing condition unrelated to user attributes, according to which an advertisement is published when the publishing condition is met;
      at least one target service type of advertisements or at least one service application system, according to which an advertisement is limited to be published in services of the at least one target service type or in the at least one target service application systems from among the at least two service application systems.

2. The system of claim 1, wherein the advertisement service Portal server is further configured for receiving user information, user subscription information and advertiser information, and saving the user information, the user subscription information and the advertiser information in the data storage device.

3. The system of claim 1, wherein the advertisement service Portal server is further configured for generating an advertisement task according to the advertisement mode, saving the advertisement task in the data storage device, examining the advertisement task;
   setting a flag to show whether the advertisement task passes the examining and saving the advertisement task and the flag in the data storage device, or sending the advertisement task passing the examining to the advertisement service central server directly.

4. The system of claim 3, wherein the advertisement service central server is configured for receiving the advertisement task passing the examining from the advertisement service Portal server or searching the data storage device to acquire the advertisement task with the flag showing that the advertisement task has passed the examining;
   searching the data storage device according to the advertisement mode in the advertisement task to acquire target user information; and
   sending the advertisement information including the advertisement contents to the service application system corresponding to the target user information.

5. The system of claim 3, wherein the advertisement service central server is further configured for storing various charge modes;
   finding a charge mode according to both the advertisement task and the target user information;
   generating a Charging Data Record (CDR), storing the CDR; and
   sending the CDR to a charge system.

6. The system of claim 3, wherein the advertisement service central server is further configured for sending or receiving the advertisement information including the advertisement contents to or from a second advertisement service central server of another system for publishing advertisement service information.

7. The system of claim 2, wherein the data storage device comprises:
   an advertisement database, storing the advertiser information and the advertisement information including both the advertisement contents and the advertisement mode; and
   a user database, storing the user information and the user subscription information.

8. The system of claim 1, further comprising:
   an advertisement gateway, implementing protocol conversion for information transferred between the advertisement service central server and the service application system.

9. The system of claim 8, wherein the advertisement gateway is further configured for sending or receiving the advertisement information including the advertisement contents to or from a second advertisement service central server of another system for publishing advertisement service information.

10. The system of claim 8, wherein the advertisement gateway is configured for storing information of service application systems and information of interface protocols, and transferring the advertisement information including the advertisement contents that is received from the advertisement service central server to the service application system through an interface protocol according to the information of the service application systems and the information of the interface protocols.

11. The system of claim 10, wherein the advertisement gateway is further configured for making statistics on various information to generate a report according to information in the data storage device, monitoring the flow of the advertisement gateway and the load of system resources, and configuring resources for each interface.

12. The system of claim 11, wherein the advertisement gateway is further configured for
storing various charge modes;
finding a charge mode according to the information received from the advertisement service central server;
generating a CDR and storing the CDR; and
sending the CDR to a charge system.

13. The system of claim 12, wherein the charge modes comprise at least one of: a preferential fee for each advertisement received, a preferential fee for advertisements received monthly, and rates for advertisements received from different service application systems.

14. The system of claim 1, wherein the at least two service application system systems include is at least two of a voice service system, a Short Message Service (SMS) system, a multimedia message system, a game service system, an email system, a stream media service system, a customized ring service system, an instant message system and a digital television system, a presence service system, and a PoC service system.

15. A method for publishing advertisement service information, comprising:
receiving, by an advertisement service Portal server of a system for publishing advertisement service information, advertisement information including advertisement contents and an advertisement mode, saving the advertisement information into a data storage device;
acquiring, by an advertisement service central server, the advertisement information from the data storage device, or receiving the advertisement information from the advertisement service Portal server;
determining, by the advertisement service central server, a service application system from among at least two service application systems which provide different service applications according to the advertisement mode in the advertisement information acquired from the data storage device or received from the advertisement service Portal device;
transferring, by the advertisement service central server, the advertisement information including the advertisement contents to the service application system determined which provided the advertisement contents for a user terminal;
wherein said advertisement mode comprises at least one of:
a user list using according to which an advertisement is published to users;
a condition that user attributes should meet, according to which an advertisement is published to the users of which attributes meet the condition;
a publishing condition unrelated to user attributes, according to which an advertisement is published when the publishing condition is met;
at least one target service type of advertisements or at least one service application system, according to which an advertisement is limited to be published in services of the at least one target service application systems from among the at least two service application systems.

16. The method of claim 15, further comprising:
upon receiving the advertisement information, generating, by the advertisement service Portal server, an advertisement task for the advertisement information according to the advertisement mode, and saving the advertisement task into the data storage device or sending the advertisement task to the advertisement service central server.

17. The method of claim 16, further comprising:
upon generating the advertisement task, examining, by the advertisement service Portal server, the advertisement task, and sending the advertisement task passing the examining to the advertisement service central server.

18. The method of claim 16, further comprising:
upon generating the advertisement task, examining, by the advertisement service Portal server, the advertisement task, and setting a flag for showing whether the advertisement task passes the examining;
acquiring, by the advertisement service Portal server, the advertisement task from the data storage device and processing the advertisement task of which the flag shows that it passes the examining.

19. The method of claim 17, wherein the process of examining the advertisement task comprises one of the two processes of:
acquiring the advertisement task from the data storage device, examining the advertisement task, and rejecting the advertisement task including a filtered keyword set in advance; and
providing an examining interface through which management personnel examines the advertisement task.

20. The method of claim 16, comprising:
searching, by the advertisement service central server, the data storage device according to the advertisement mode in the advertisement task;
obtaining the advertisement contents and target information; and
sending the advertisement information including the advertisement contents to a target service application system or a target system for publishing advertisement service information according to the target information.

21. The method of claim 20, further comprising:
upon sending the advertisement information including the advertisement contents to the target service application system or the target system for publishing advertisement service information, obtaining, by the advertisement service central server, a charge mode from various charge modes stored in advance according to the advertisement task, generating a CDR according to the charge mode and storing the CDR.

22. The method of claim 21, wherein the process of sending the advertisement information including the advertisement contents to the target service application system or the target system for publishing advertisement service information comprises:
sending, by the advertisement service central server, the advertisement information including advertisement contents to an advertisement gateway;
implementing, by the advertisement gateway, protocol conversion for the advertisement information;
upon converting the advertisement information to protocol information accepted by the target service application system or the target system for publishing advertisement service information, sending the advertisement information converted to the target service application system or the target system for publishing advertisement service information.

23. The method of claim 22, further comprising:
upon sending the advertisement information to the target service application system, obtaining, by the advertisement gateway, the charge mode from the various charge modes stored in advance according to the advertisement task, generating the CDR and storing the CDR.

24. The method of claim 22, further comprising:
implementing, by the advertisement gateway, flow control on the advertisement information sent by the advertisement service central server.

25. The method of claim 22, further comprising:
making, by the advertisement gateway, statistics on various information to generate a report according to information in the data storage device, monitoring flow of the advertisement gateway and load of system resources, and configuring resources for each interface.

26. The method of claim 22, wherein, when the at least two service application system comprises system comprise at least two of an SMS system, the advertisement gateway communicates with the Internet Short Message Gateway (ISMG) of the SMS system by China Mobile Peer to Peer Protocol/ Short Message Gateway Interface Protocol (CMPP/SGIP) and sends the advertisement information including advertisement contents to the SMS centre through the ISMG, and the SMS centre forwards the advertisement information including advertisement contents to a user terminal in a short message format; or
the advertisement gateway communicates directly with the SMS centre of the SMS system through a Short Message Peer to Peer (SMPP) protocol, and the SMS centre forwards the advertisement information including advertisement contents to a user terminal in a short message format.

* * * * *